United States Patent
Serbanescu et al.

(10) Patent No.: US 10,804,772 B2
(45) Date of Patent: Oct. 13, 2020

(54) ELECTRIC CIRCUIT FOR USE IN AN ELECTRIC POWER ASSISTED STEERING SYSTEM

(71) Applicant: TRW Limited, Solihull, West Midlands (GB)

(72) Inventors: Radu Florin Serbanescu, Birmingham (GB); Alan John Biggs, Redditch (GB); Mahmad Hussain Valiji, Edgware (GB); David Jonathan Coles, Birmingham (GB); Steven Berry, Rowley Riggs (GB)

(73) Assignee: TRW Limited, Solihull, West Midlands (GB)

( * ) Notice: Subject to any disclaimer, the term of this patent is extended or adjusted under 35 U.S.C. 154(b) by 447 days.

(21) Appl. No.: 15/550,522

(22) PCT Filed: Feb. 11, 2016

(86) PCT No.: PCT/GB2016/050332
§ 371 (c)(1),
(2) Date: Aug. 11, 2017

(87) PCT Pub. No.: WO2016/128756
PCT Pub. Date: Aug. 18, 2016

(65) Prior Publication Data
US 2018/0041098 A1    Feb. 8, 2018

(30) Foreign Application Priority Data

Feb. 11, 2015 (GB) .................................. 1502265.0
Oct. 27, 2015 (GB) .................................. 1518983.0

(51) Int. Cl.
*H02K 3/52* (2006.01)
*H01R 12/58* (2011.01)
*H02K 11/33* (2016.01)

(52) U.S. Cl.
CPC ........... *H02K 11/33* (2016.01); *H01R 12/585* (2013.01); *H02K 3/522* (2013.01); *H02K 3/524* (2013.01); *H02K 2203/03* (2013.01)

(58) Field of Classification Search
CPC ..... B60R 16/00; B60R 16/027; H01R 35/025; H01R 2101/00; H01R 2101/26;
(Continued)

(56) References Cited

U.S. PATENT DOCUMENTS 2,968,780 A    1/1961   Roswell
3,745,513 A    7/1973   Gross
(Continued)

FOREIGN PATENT DOCUMENTS

GB    2516555 A    1/2015

OTHER PUBLICATIONS

Great Britain Search Report, Application No. GB1502265.0, dated Aug. 7, 2015.
(Continued)

*Primary Examiner* — Edwin A. Leon
*Assistant Examiner* — Milagros Jeancharles
(74) *Attorney, Agent, or Firm* — MacMillan, Sobanski & Todd, LLC (57) ABSTRACT

An electric circuit for use in an electric power assisted steering system comprises
a motor having a plurality of phases and for each phase at least one stator coil wire that extends from the motor and terminates at a terminal end; a circuit board comprising at least one electrically conductive track supported at least partially by a carrier, the track being electrically connected to at least one drive stage switch;
a connector comprising: a base part having a guide hole extending there through that in use is aligned with a corresponding through-hole in the track of the circuit board, (Continued)

a support arm that is connected to the base part and extends away from the base part and a connecting part that is supported by the support arm, the support arm being flexible to permit relative movement between the connecting part and the base part, and securing means for securely fixing the connector to the track of the printed circuit board. In use the at least one stator coil wire extends through the hole in the printed circuit board and the guide hole in the base part so that the wire is in electrical contact with the connecting part of the connector, the connecting part securely holding the wire in position.

10 Claims, 4 Drawing Sheets

(58) Field of Classification Search
CPC .... H01R 12/585; H01R 12/50; H01R 12/523; H01R 12/53; H01R 12/675; H02K 11/33; H02K 2203/03; H02K 3/522; H02K 3/524; H02K 3/525; H02K 3/52
See application file for complete search history.

(56) References Cited

U.S. PATENT DOCUMENTS

| | | | |
|---|---|---|---|
| 5,064,379 A | 11/1991 | Ryll et al. | |
| 5,770,902 A * | 6/1998 | Batten | H02K 5/225 |
| | | | 310/71 |
| 8,113,891 B1 | 2/2012 | Huang et al. | |
| 9,337,595 B1 * | 5/2016 | Herring | H01R 25/16 |
| 9,479,030 B2 * | 10/2016 | Motoda | H02K 15/00 |
| 10,424,991 B2 * | 9/2019 | Yamasaki | H02K 11/215 |
| 2006/0006749 A1 * | 1/2006 | Sasaki | B62D 5/0406 |
| | | | 310/68 R |
| 2011/0151692 A1 * | 6/2011 | Ohnishi | H01R 13/03 |
| | | | 439/83 |

OTHER PUBLICATIONS

Great Britain Search Report, Application No. GB1518983.0, dated Apr. 26, 2016.
PCT International Search Report and the Written Opinion, Application No. PCT/GB2015/050332 filed Feb. 11, 2016, dated Apr. 22, 2016.

* cited by examiner

ELECTRIC CIRCUIT FOR USE IN AN ELECTRIC POWER ASSISTED STEERING SYSTEM

CROSS-REFERENCE TO RELATED APPLICATIONS

This application is the National Phase of International Application PCT/GB2016/050332 filed Feb. 11, 2016 which designated the U.S. and that International Application was published in English under PCT Article 21(2) on Aug. 18, 2016 as International Publication Number WO 2016/128756A1. PCT/GB2016/050332 claims priority to Great Britain Patent Application No. 1502265.0, filed Feb. 11, 2015 and Great Britain Patent Application No. 1518983.0, filed Oct. 27, 2015. The disclosures of these applications are incorporated herein by reference.

BACKGROUND OF THE INVENTION

This invention relates to improvements in electrical circuits for use, in particular, in an electric power assisted steering system.

Electric power assisted steering systems are known of the kind in which an electric motor applies assistance torque to a part of the steering in order to assist the driver of the vehicle in turning the wheel. The motor may typically act upon the steering column or may act upon the steering rack, through a reduction gearbox. A measurement of the torque applied to the steering apparatus by the driver when turning the wheel is passed to a processor which produces a torque demand signal which is in turn used to control the motor to produce the required assistance torque. Applying an assistance torque of the same sense as the driver applied torque reduces the amount of effort needed to turn the wheel.

The motor, which may be a star or wye connected motor, such as a multiphase permanent magnet motor, is controlled by a motor control circuit and a motor drive circuit. The motor drive circuit typically comprises a heavy duty circuit board, typically a printed circuit board (PCB), which supports switches which can be opened and closed to connect the phases of the motor to a DC source, such as a battery or an earth, in response to a control pattern provided by the control circuit. Specifically, each phase is connected at the free end of the phase winding wire to a positive supply rail through a top transistor secured to the PCB which when turned on connects the motor phase to a battery positive terminal connected to the positive supply rail. Similarly, the second free end of each phase winding wire is connected through a bottom transistor to a negative supply rail through a bottom transistor. When switched on the bottom transistor connects the phase to the negative rail which is in turn connected to a battery negative or earth. The two transistors—top and bottom-form one arm of a multiple arm bridge circuit that is the heart of the drive circuit. By opening and closing the switches it is possible to selectively and independently route current through each phase of the motor.

The control circuit comprises a digital or analogue circuit or some combination of both. This may be provided on the same PCB as the drive stage or separately. It does not need to carry the same levels of current as the drive stage, and so can be implemented using smaller components, perhaps being integrated into a dedicated semiconductor chip. The function of the control circuit is to supply control signals to the bridge transistors to open and close them in a pattern which in turn causes the current to flow through the phases as required for a given motor torque and speed. Generally the pattern will be set by the control circuit according to the motor position and the torque measured in the steering system by a torque sensor. Typically the pattern for each arm of the bridge comprises a pulse width modulated waveform.

The circuit board typically comprises electrically conductive tracks printed or otherwise secured to an electrically insulating carrier. Other forms of circuit board may be used. Permanent electrical connections are therefore needed from the motor phase winding wires to this board. For a three phase motor this will typically require at least 3 separate connections.

The applicant has appreciated that connecting the wires of a motor to a printed circuit board in the harsh environment encountered during use of an electric power assisted steering system is problematic. The motor will often be located towards the base of the steering column in an area of the vehicle which his unheated and may also be exposed to heat soak from the engine and other component parts. A temperature range of −40 to +150 degrees C. can be expected and this can cause problems due to the thermal expansion of the conductive wires and tracks. The wires have to be of thick gauge to cope with the high levels of current demanded by the motor, making them relatively inflexible.

SUMMARY OF THE INVENTION

According to a first aspect the invention provides an electric circuit for use in an electric power assisted steering system comprising:

a motor having a plurality of phases and for each phase at least one stator coil wire that extends from the motor and terminates at a terminal end;

a circuit board comprising at least one electrically conductive track supported at least partially by a carrier, the track being electrically connected to at least one drive stage switch;

a connector comprising:

a base part having a guide hole extending there through that in use is aligned with a corresponding through-hole in the track of the circuit board, a support arm that is connected to the base part and extends away from the base part and a connecting part that is supported by the support arm, the support arm being flexible to permit relative movement between the connecting part and the base part, and securing means for securely fixing the connector to the track of the printed circuit board, whereby in use the at least one stator coil wire extends through the hole in the printed circuit board and the guide hole in the base part so that the wire is in electrical contact with the connecting part of the connector, the connecting part securely holding the wire in position.

The whole of the connector, or a part of the connector that is less than the whole, may have a high electrical conductivity to provide a path for electrical current from the wire through the securing means to a track on the printed circuit board. The connector may be wholly highly electrically conductive, and in a most preferred arrangement is a metal or metal alloy part.

The arm may be both flexible and resilient so that it acts as a spring when a load is applied. It should not be so flexible that it does not provide any support for the wire.

The connector may be an insulating material, for instance a moulded plastic component, with a conductive insert that extends between a region that contacts the track and a region that contacts the wire at the connecting part.

Preferably the connector comprises a unitary component made of a conductive material such as a metal or metal alloy. Most preferably the connector comprises a copper core with a silver plated coating.

The securing means may provide both physical and electrical connections and may preferably include at least one deformable pin. Alternatively, the securing means may provide just a physical connection, for instance where the electrical connection is provided by a solder junction or other form of electrical connection. The or each deformable pin may form an interference fit with the printed circuit board to provide a secure connection whilst simultaneously being simple to fit.

The wire, by which we mean an elongate rod typically of metal and preferably cylindrical, may be a snug fit within the guide hole. It may be held within the guide hole so that it can move axially by sliding over the surface of the guide hole but not move radially. There may be a small clearance between the wire and guide hole when assembled, or there may be no clearance.

The guide hole may for example be round and the wire may be round in cross section, the inner diameter of the guide hole being substantially equal to the outer diameter of the wire.

The wire may be coated with an insulating material over at least the portion that passes through the guide hole. This coating may be omitted in the region where the wire joins the connecting part of the connector.

The wire may have a diameter (the conductive portion) in the range of substantially 1 mm to 3 mm, and may be a copper wire.

In one arrangement the connecting part may be secured to the wire by a hot crimp process, burning off any insulating coating that would otherwise prevent an electrically conductive connecting being made. In an alternative any insulating material may be stripped off prior crimping, allowing a cold crimping process to be used.

A part of the connector may extend into or through the hole in the printed circuit board or the connector may be located entirely on one side of the printed circuit board. It is preferred that it does not extend into the hole but instead has a generally flat lower surface to the base that sits flush with a generally flat upper surface of a track on the printed circuit board.

The support arm may include one or more bends or kinks between the base part and the connecting part whereby in use any axial load applied to the wire that would tend to pull the connecting part towards the printed circuit board or push it away from the printed circuit board will tend to cause the connecting part to bend or kink by a greater or lesser amount.

The support arm may be bent or curved to such an extent that the connector, when viewed in plan, is C-shaped with the base at the bottom of the C and the connector part overhanging the base at the top of the C.

The connector part may be located directly above the guide hole in the base so that when assembled the wire passes through the printed circuit board at a right angle to the printed circuit board to engage the connector part.

The support arm may have a generally rectangular cross section along its length as viewed in a section taken parallel to the surface of the printed circuit board, and the support arm may generally comprise an elongate member, i.e. the width and thickness of the arm is less than the length of the arm as measured from where it joins the base portion to where it joins the connecting part.

The support arm may located the connecting part at least 5 mm above the base part, and a preferred distance in the range 5 mm to 9 mm may be chosen. The total length of the support arm, including the bends or kinks, may be between 10 percent and 100 percent greater than the distance between the base and the connecting part. The greater the distance the more flexible the arm, and a balance must be struck between the arm being too flexible to support the wire and too rigid to prevent excess stress being transferred to the solder pad. Of course, the thickness and width of the arm and the material chosen also have an impact on the flexibility.

The connecting part may be supported above the track by a distance that is sufficient to allow clear access to the connecting part by a crimping head of a hot crimping tool without interference from other components on the track. Again, the applicant has found that this can be achieved by a distance of at least 5 mm. Shorter distances may be possible but may require careful positioning of adjacent components on the circuit board.

The base part may comprise a disk shaped member having an upper face and an opposing lower face, the guide hole passing through the disk to connect the two faces.

The disk may have a radius of at least 7 mm and preferably at least 8 mm.

The base part may include an alignment guide that helps during assembly to ensure it is aligned correctly. This may comprise an indent in one part of the circumference that can be aligned with a corresponding marking on the track or cooperates with a protrusion or recess on the track.

The supporting arm may connect to a segment of the disk at its outer edge.

The disk may have a thickness that is substantially the same as the thickness of the supporting arm, so that the disk and arm may be formed by bending a flat "blank" that is in the form of a disk having an arm extending away from the circumference.

The securing means may comprise a fusible joint that securely fixes the connector to the track of the printed circuit board. The fusible joint may comprise a soldered connection, which may be formed from a solder pad of metal or metal alloy. This may comprise a ring of solder with the hole in the ring being greater in diameter than the hole in the printed circuit board. The outer diameter of the solder pad may be greater than the outer diameter of the base part in the case that the base part is a ring. The solder pad may have a contact area of at least 20 mm$^2$.

The securing means may provide a path for the conduction of electricity from the track on the board through the connector to the wire. The wire may be insulated in any area that may directly contact the base of the connector or the track, to prevent arcing between the two, so that all current flows through the arm of the connector.

The assembly may comprise multiple connectors, each as described above and each aligned with a hole in the PCB and a track on the PCB. And each being fixed to a respective phase winding wire.

For a three phase motor, there may be at least 3 phase winding wire ends and hence three connectors, and in a preferred arrangement each winding wire ends provides connections to 4 motor windings for a 12 segment stator.

In an alternative, the motor may be a three phase motor and the drive circuit may comprise a dual bridge circuit, with two phase winding wires being provided for each phase of the motor, one per bridge circuit. Each wire for a phase may connect to a subset of stator segments for the respective motor phase which together with dual bridge provides inherent redundancy.

The circuit may additionally include two connectors and two associated wires for connecting to a battery supplying current to the circuit board.

The circuit board may comprise a variety of forms including both laminated and unlaminated boards. In a laminated board, often called a printed circuit board (PCB), the track is supported by a carrier that is in the form of an insulated substrate. Another suitable type of circuit board is an insulated metal substrate type circuit board comprising a single layer copper track with di-electric material and an aluminium base which contact the interface, and a still further suitable type of board is a direct bonded ceramic circuit board (DBC) comprising copper tracking bonded onto a ceramic tile.

The tracks of the circuit board may be fully supported by the substrate, for instance by forming the substrate and tracks as a laminate. Alternatively, the substrate may function as a guide and location for at least one track that is at least partially self-supporting, such as a track of a rigid lead frame.

The hole in the track that the wire passes through may also extend through any substrate of the circuit board that would otherwise obscure the hole in the track.

The electrical circuit may comprise a part of an electric power assisted steering system in which the motor applies in use an assistance torque to the steering that helps a driver to turn a steering wheel of the vehicle.

According to a second aspect the invention provides an electrical connector for use in connecting a phase winding wire of an electric motor of an electrical power assisted steering system to a conductive track of a circuit board, the connector comprising: a base part having a guide hole extending there through that in use is aligned with a corresponding through-hole in the track, a support arm that is connected to the base part and extends away from the base part; and a connecting part that is supports by the support arm, the support arm being resiliently flexible to permit relative movement between the connecting part and the base part.

The connector, or at least part of the connector, may comprise an electrically conductive material to provide a path for electrical current form the wire through the solder joint to the track on the printed circuit board.

Preferably the connector comprises a unitary component made of a conductive material such as a metal or metal alloy. Most preferably the connector comprises a copper material, optionally with a coating such as silver or a tin/nickel alloy coating.

The support arm may include a bend or kink between the base part and the connecting part.

The electrical connector may further comprise securing means for enabling connection to a printed circuit board. The securing means may preferably provide both physical and electrical connections. In a preferred embodiment, the securing means may include at least one deformable pin.

The support arm may be resilient such that the bend of kink facilitates deformation of the support part under load in the manner of a leaf spring, the arm returning substantially to an original shape when the load is removed.

The support arm may be bent or curved to such an extent that the connector, when viewed in plan, is C-shaped with the base at the bottom of the C and the connector part overhanging the base at the top of the C.

The connector part may be directly above the guide hole of the base part so that when assembled a wire may pass through the hole to contact the connector part.

The support arm may have a generally rectangular cross section along its length as viewed in a section taken parallel to the surface of the printed circuit board, and the support arm may generally comprise an elongate member.

The base part may have a minimum width (measured across any part of the base part that passes through its centre) of 14 mm and preferably at least 16 mm. Where the base has a cylindrical perimeter wall this minimum width will correspond to the diameter of the base part. The base part may provide an area for contact by the solder pad of at least 20 mm$^2$ and preferably at least 23 mm$^2$.

According to a third aspect the invention provides a method of assembling an electrical power assisted steering motor circuit according to the first aspect of the invention comprising the steps of:

Providing a circuit board with a hole that extends through at least one conductive track of the board, Locating a connector of the second aspect so that the holes in the connector part and board are aligned, Securing the connector to the board, Passing the free end of a motor winding wire through the guide hole so that a portion of the wire is located in the space between the fingers of the connecting part, and Crimping the fingers onto the wire to make an electrical connection to the wire.

The step of crimping may comprise a step of hot crimping to ensure any insulation on the wire between the fingers is burnt away.

The method may be repeated for each connector secure to the board, either one at a time or more than one, perhaps all of them, at a time.

By providing a connector that includes a combination of features including a guide hole and a flexible connecting arm the electrical circuit of the present invention is able to connect the drive stage to the motor in a way that can deal with the large ranges of temperature encountered in an electric power assisted steering system. Both features work together to help to keep the stresses at the solder joint to acceptable levels, reducing the risk of failure of the solder joint.

The step of fusing the connector to the track may comprise soldering the connector to the track by applying heat to a soft fusible metal alloy solder.

According to a fourth aspect there is provided an electric circuit for use in an electric power assisted steering system comprising:

a motor having a plurality of phases and for each phase at least one stator coil wire that extends from the motor and terminates at a terminal end;

a circuit board comprising at least one electrically conductive track supported at least partially by a carrier, the track being electrically connected to at least one drive stage switch and having a through-hole;

a connector comprising:

a base part, a support arm that is connected to the base part and extends away from the base part and a connecting part that is supported by the support arm, the support arm being flexible to permit relative movement between the connecting part and the base part, and securing means for securely fixing the connector to the track of the printed circuit board, whereby in use the at least one stator coil wire extends through the hole in the printed circuit board so that the wire is in electrical contact with the connecting part of the connector, the connecting part securely holding the wire in position.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
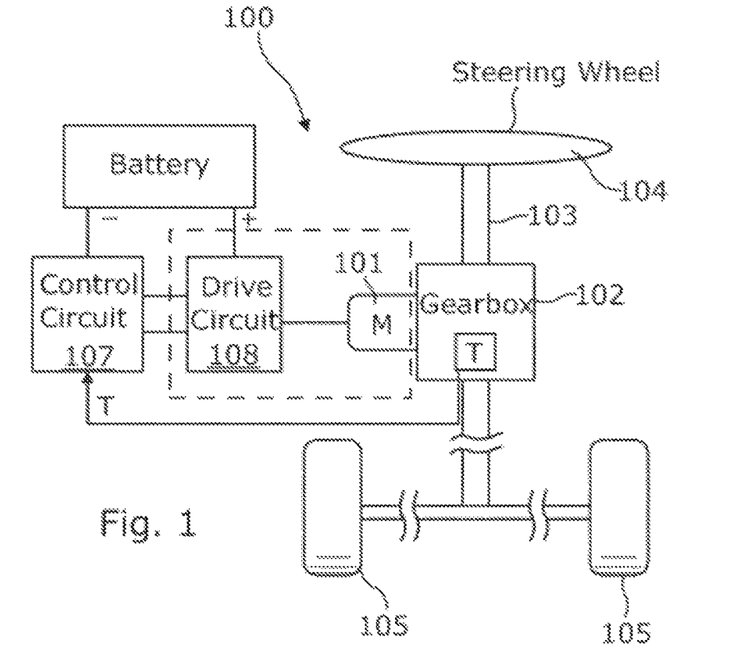
FIG. 1 is an overview of an electric power assisted steering system.

As shown in FIG. 1, a typical electric power assisted steering system 100 comprises an electric motor (M) 101 that in use applies assistance torque through a gearbox 102 to a rotatable part 103 of the steering in order to assist the driver of the vehicle in turning the steering wheel 104 and hence turning the road wheels 105. The motor 101 may typically act upon the steering column 103 or may act upon the steering rack. A torque sensor 106 produces as an output signal T measurement of the torque applied to the steering apparatus by the driver when turning the wheel is passed to a processor which produces a torque demand signal which is in turn used to control the motor to produce the required assistance torque. Applying an assistance torque of the same sense as the driver applied torque reduces the amount of effort needed to turn the wheel.

The motor 101, which may be a star or wye connected motor, such as a multiphase permanent magnet motor, is controlled by a motor control circuit 107 and a motor drive circuit 108. These circuits, or at least the drive circuit, may be bolted directly to the end of the motor housing (the physical connection being represented in FIG. 1 by the dashed box). This physical relationship can also be seen in FIG. 5 of the drawings.

Figure 2:
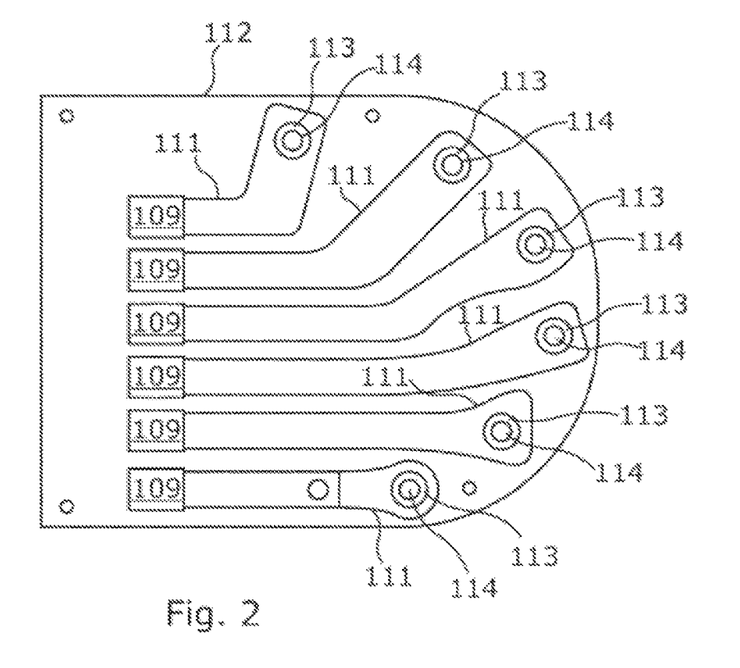
FIG. 2 is view in plan of a printed circuit board of the system of FIG. 1 prior to assembly.

As shown in FIG. 2 the motor drive circuit 108 comprises switches 109, in this example transistors, which can be opened and closed to connect the phases of the motor to a DC source, such as a battery or an earth, in response to a control pattern provided by the control circuit. Each switch is connected to the phase through a conductive track 111 printed on a printed surface board 112. Specifically, each phase is connected to a positive supply rail through a top transistor which when turned on connects the motor phase to a battery 110 positive terminal connected to the positive supply rail. Similarly, each phase is connected through a bottom transistor to a negative supply rail through a bottom transistor. When switched on the bottom transistor connects the phase to the negative rail which is in turn connected to a battery negative or earth. The two transistors—top and bottom-form one arm of a multiple arm bridge circuit that is the heart of the drive circuit. By opening and closing the switches it is possible to selectively and independently route current through each phase of the motor.

The control circuit 107 comprises a digital or analogue circuit or some combination of both. The function of the control circuit is to supply control signals to the bridge transistors to open and close them in a pattern which in turn causes the current to flow through the phases as required for a given motor torque and speed. Generally the pattern will be set by the control circuit according to the motor position and the torque measured in the steering system by a torque sensor. Typically the pattern for each arm of the bridge comprises a pulse width modulated waveform.

An exemplary printed circuit board 112 and components is shown in FIG. 2. As can be seen, the board 112 comprises an insulating substrate and a series of electrically conductive tracks 111. Each track 111 has a through hole 113 at one region and extends to a motor drive switch 109 in a second region. The through hole 113 is generally circular when seen from above the circuit board and has a diameter greater than the diameter of a motor winding wire 114 that is passed through the hole at right angles to the plane of the PCB 112. As will be explained, this allows the wires to pass through the holes without excessive friction between the wire and printed circuit board.

Figure 3:
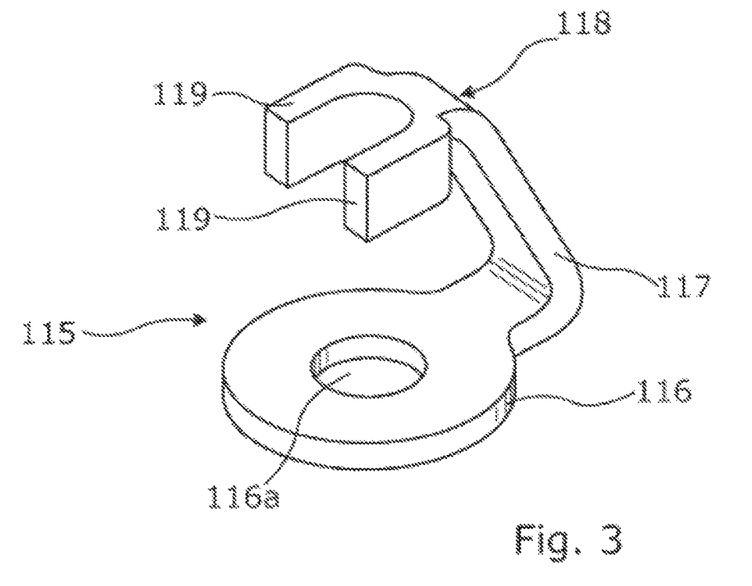
FIG. 3 is a view in perspective of a connector of the system of FIG. 1 prior to assembly.

Associated with each hole is a connector 115, an exemplary embodiment of which is shown in FIG. 3. The connector 115 provides the physical connection of the motor wire to the associated track. The connector 115 comprises a unitary component of metal construction, which may be stamped and shaped from a single sheet of stock material but could in other embodiments be formed by a moulding process if preferred.

The connector has three main sections. A first base part 116 comprises a generally planar disk with a central guide hole 116a formed within the disk, the axis of the hole in this example being aligned with the axis of the disk so that base resembles a ring shaped part of constant perimeter width. The inner walls of the guide hole are radiused so that they form a smooth passage with no sharp edges.

Extending away from the base part 116 is a support arm 117. The arm, which comprises an elongate bar of generally rectangular cross section, extends away from the base part 116. The arm 117 is bent into a c-shape so that, when viewed in elevation from one side, it initially extends away from the axis of the base part before curving back towards the axis of the base part where it terminates at a location that is above and to one side of the guide hole.

The free end of the support arm 117 supports a connector part 118. This comprises two spaced apart fingers 119, each one extending from an opposing edge of the free end of the support arm. The fingers and the end of the support arm from a c-shaped portion when the connector is viewed in plan, again removing any sharp edges. Importantly the support arm supports this connector part 118 above the hole 116a in the base part, so that a wire passing orthogonally through the guide hole will pass through the space between the two fingers. The fingers are metal. Notably, the fingers, as with the rest of the connector, are not coated with any insulating material.

The support arm 117, in part because it is relatively thin in cross section along its length, and also because it is bent, provides some springiness or compliance that allows the connector part to move towards or away from the guide hole 116a as a load is applied to it. As will become apparent this is a beneficial feature in reducing the effect of thermally induced stress on the motor circuit when assembled.

Because the connector is a metal component, there is a good electrically conductive path from the connecting part down through the arm to the base part.

Figure 4:
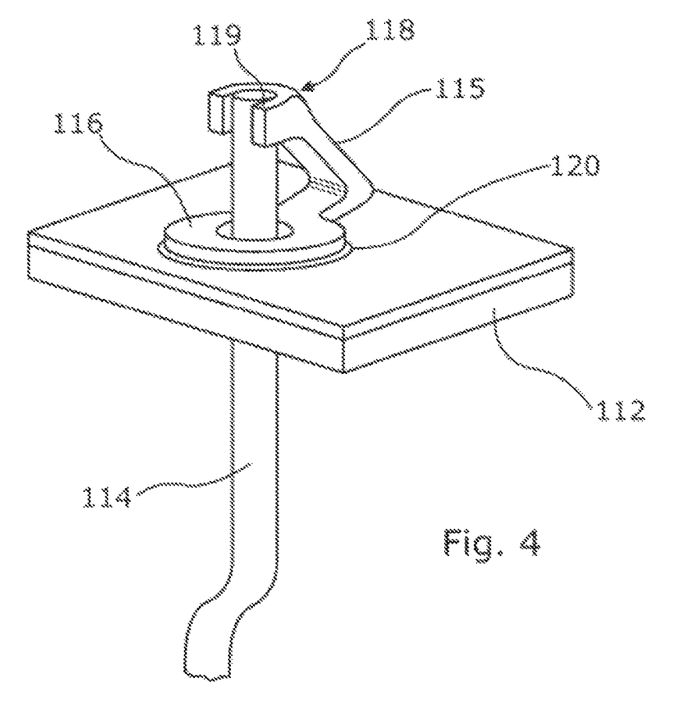
FIG. 4 shows the printed circuit board, a connector and an associated motor wire when assembled.

FIG. 4 shows in perspective view one of the connectors in a position of use. As can be seen, the connector 115 is located so that the base sits on top of the printed circuit 112 board, overlaying a region of exposed conductive PCB track 111. The hole in the base is aligned with a through hole 113 in the PCB, and a region of solder, such as a solder pad 120, is located between the base and the track and provides a securing means. A protruding edge of the pad 120 can be seen in FIG. 4 although it does not need to protrude beyond the edge of the base part. The pad comprises a ring which does not obscure the hole in the pad or the hole in the PCB, and forms a rigid mechanical and electrical joint between the base and the track. A suitable solder is silver or a tin/nickel alloy coating.

The support arm 117 extends away from the top face of the PCB 112 and holds the connecting fingers 119 above the hole in the PCB. A free end of a wire 114 of the motor, which in this example is a rigid single core plastic coated wire, extends through the hole. The wire 114 is a snug fit inside the hole 116a so that the hole helps to support and guide the wire. In this position a portion of the free end of the wire is located between the fingers of the connecting part. These fingers 119, as shown are tightly pressed onto the wire. To ensure a good grip and a good electrical connection the fingers are crimped onto the wire using a hot crimping process, so that it is simultaneously compressed onto the wire and burns off any insulation that may be present between the fingers and the core of the wire.

In this position of use shown in FIG. 4, the wire 114 is supported by the connecting part 118 and located by the guide hole 116a. Because the supporting part is bent and resilient, any forces due to thermal expansion of the wire result in a straightening or bending (for increases and decreases in temperature respectively) of the supporting arm. This reduces strain on the solder joint.

The connector 115 provides a good electrical path between the wire and the track and the track may then provide an onward electrical connection to the drive stage for the motor or any other suitable part of the motor circuit.

Figure 5:
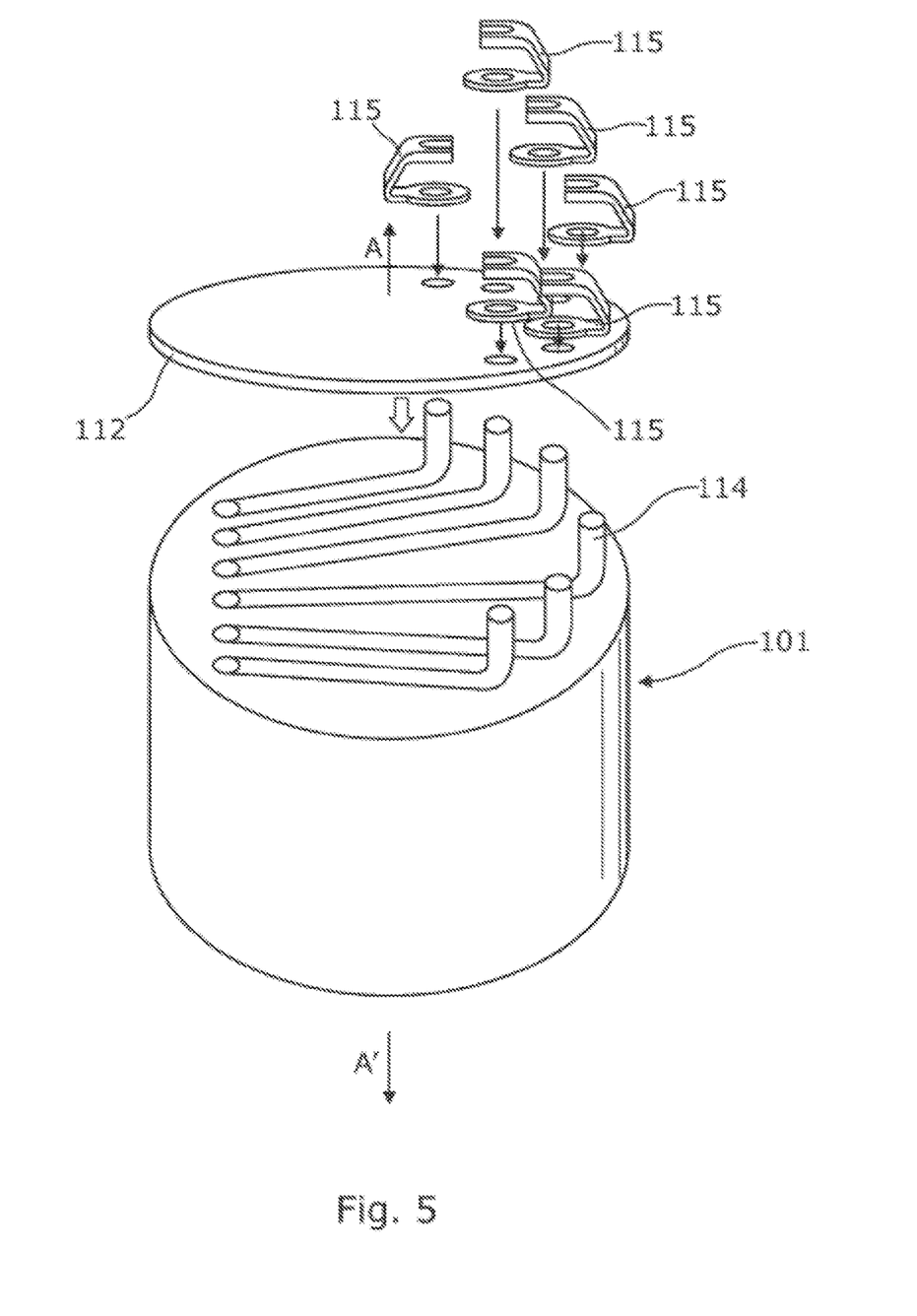
FIG. 5 shows the location of the motor housing, motor wire, printed circuit board, solder pad and connector exploded vertically along the line A-A.

FIG. 5 shows the relative locations of the six connectors 115 of the embodiment, the motor 101 and the motor wires 114 in an exploded view along the vertical line A-A'. As can be seen the printed circuit board 112 is securely located on an end of the motor with direct connections through the wires of all the motor winding ends to the respective tracks when assembled.

Figure 6A:
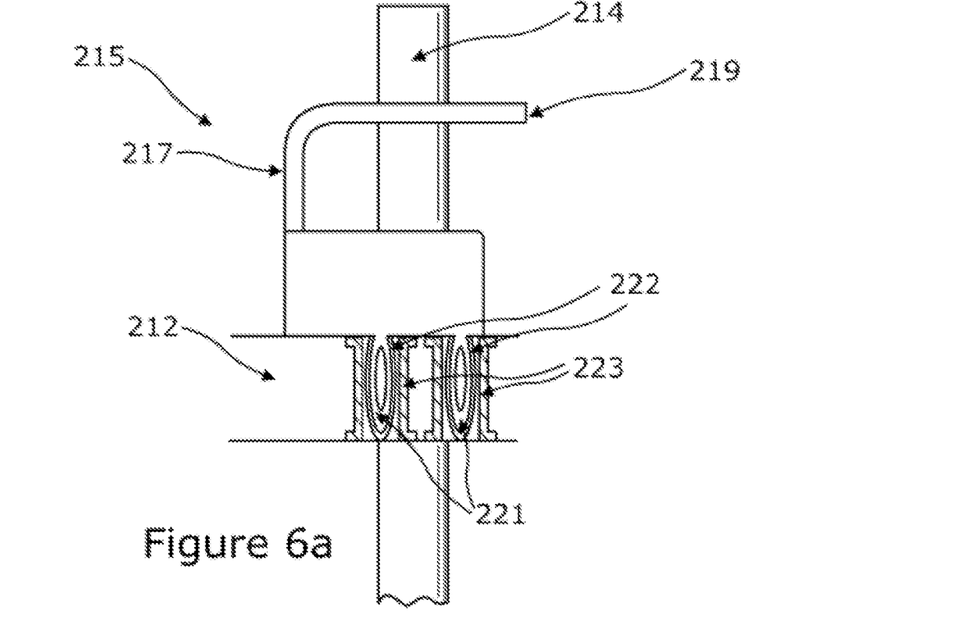
FIGS. 6a and 6b show a second embodiment of a connector, including deformable pins.
Figure 6B:
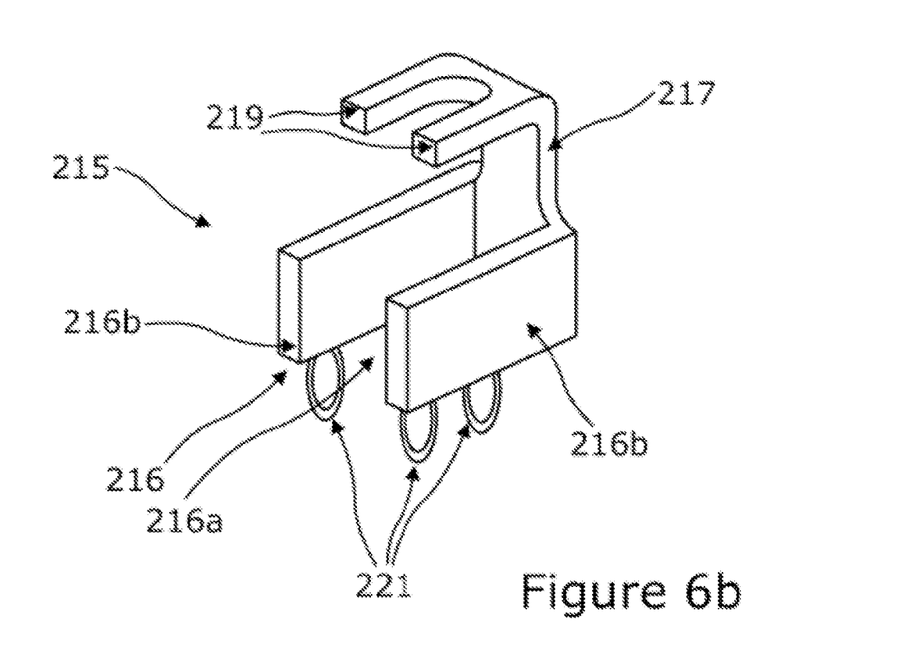

A second embodiment of a connector 215 is shown in use in FIG. 6a, and individually in FIG. 6b. The connector 215 is seated on a printed circuit board 212, away from which a support arm 217 extends. As in the previous embodiment, the support arm 217 terminates in two connecting fingers 219 which provide support to a wire 214 which passes through the printed circuit board 212.

The base part 216 of the present embodiment is effectively U-shaped having two arms 216b and a guide hole 216a formed between the arms 216b. The guide hole thus guides the wire after it passes through the printed circuit board 212. The base part may instead be continuous as in the first embodiment, so as to form an enclosed guide hole.

Securing means, which in this embodiment are four deformable pins 221 which extend from the base part 216, provide a secure connection to the printed circuit board 212. Two deformable pins protrude from each arm 216b of the base part 216. A greater or lesser number of deformable pins 221 may be provided. The deformable pins 221 are receivable within mounting holes 222 within the printed circuit board 212. In the present embodiment, the deformable pins 221 additionally provide electrical connection of the connector 215 to the printed circuit board 212. To achieve this, the mounting holes 222 are through-plated with tracks 223. In use, when within the mounting holes 222, the deformable pins 221 provide an interference fit with the printed circuit board 212, ensuring a good electrical connection via the tracks 223 along with rigid mounting of the connector 215.

The two securing means of the disclosed embodiments, which each provide secure fixing of their respective connectors, are not limiting to the invention and other securing means may also be used in addition or as a substitute for those described. For example, non-interference pins or plugs may be utilised, or even press- or snap-fit connections. Otherwise, adhesive may be suitable in certain situations. The securing means, whilst hereinbefore described as providing both physical and electrical connection may provide one or the other, as necessary. For instance, deformable pins may provide secure fixation whilst solder provides the electrical connection of the connector to the printed circuit board. Other physical and electrical securing means, or combinations thereof, will be known to those skilled in the art.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electric circuit for use in an electric power assisted steering system comprising:
   a motor having a plurality of phases and for each phase at least one stator coil wire that extends from the motor and terminates at a terminal end;
   a circuit board comprising at least one electrically conductive track supported at least partially by a carrier, the track being electrically connected to at least one drive stage switch, wherein the circuit board has a first through-hole through which the at least one stator coil wire passes, and wherein the circuit board has at least one mounting hole which is through-plated with the conductive track; and
   a connector comprising:
      a base part having a guide hole extending therethrough that in use is aligned with the first through-hole in the circuit board;
      a support arm that is connected to the base part and extends away from the base part;
      a connecting part that is supported by the support arm, the support arm being flexible to permit relative movement between the connecting part and the base part; and
      at least one deformable pin which is deformably received in the at least one mounting hole for rigidly mounting the connector to the circuit board by a press fit and for electrically connecting to the track of the circuit board;
   wherein the at least one stator coil wire extends through the hole in the printed circuit board and the guide hole in the base part so that the wire is in electrical contact with the connecting part of the connector, the connecting part securely holding the wire in position.

2. The electric circuit according to claim 1 wherein the arm of the connector is both flexible and resilient so that it acts as a spring when a load is applied.

3. The electric circuit according to claim 1 in which the connector comprises a unitary component made of metal or metal alloy.

4. The electric circuit according to claim 1 in which the wire is a snug fit within the guide hole of the connector.

5. The electric circuit according to claim 1 in which the wire is coated with an insulating material over at least the portion that passes through the guide hole.

6. The electric circuit according to claim 1 in which the support arm includes one or more bends or kinks between the base part and the connecting part whereby in use any axial load applied to the wire that would tend to pull the connecting part towards the track or push it away from the track will tend to cause the connecting part to bend or kink by a greater or lesser amount.

7. The electric circuit according to claim 6 in which the support arm is bent to such an extent that the connector, when viewed in plan, is C-shaped with the base at the bottom of the C and the connector part overhanging the base at the top of the C.

8. The electric circuit according to claim 1 in which the connector part is located directly above the guide hole in the base so that when assembled the wire passes through the guide hole at a right angle to the circuit board to engage the connector part.

9. The electric circuit according to claim 1 in which the base part comprises a disk shaped member having an upper face and an opposing lower face, the guide hole passing through the disk to connect the two faces.

10. An electric circuit for use in an electric power assisted steering system comprising:
   a motor having a plurality of phases and for each phase at least one stator coil wire that extends from the motor and terminates at a terminal end;
   a circuit board comprising at least one electrically conductive track supported at least partially by a carrier, the track being electrically connected to at least one drive stage switch, wherein the circuit board has a first through-hole through which the at least one stator coil wire passes, and wherein the circuit board has at least one mounting hole which is through-plated with the conductive track; and
   a connector comprising:
      a base part having a U-shaped guide hole between two arms, wherein the guide hole is aligned with the first through-hole in the circuit board;
      a support arm that is connected to the base part and extends away from the base part; and
      a connecting part that is supported by the support arm, the support arm being flexible to permit relative movement between the connecting part and the base part; and
      at least one deformable pin extending from the base part which is deformably received in the at least one mounting hole for rigidly mounting the connector to the circuit board by a press fit and for electrically connecting to the track of the circuit board;
   whereby in use the at least one stator coil wire extends through the hole in the printed circuit board so that the wire is in electrical contact with the connecting part of the connector, the connecting part securely holding the wire in position.

* * * * *